United States Patent [19]

Slater

[11] Patent Number: 5,419,631

[45] Date of Patent: May 30, 1995

[54] THREE-AXIS MOTION TRACKING INTERFEROMETER FOR MEASUREMENT AND CORRECTION OF POSITIONAL ERRORS BETWEEN AN ARTICLE UNDER TEST AND A MEASUREMENT PROBE

[75] Inventor: Dan Slater, La Habra Heights, Calif.

[73] Assignee: Nearfield Systems Incorporated, Carson, Calif.

[21] Appl. No.: 180,366

[22] Filed: Jan. 12, 1994

[51] Int. Cl.⁶ .............................................. G01B 11/02
[52] U.S. Cl. .................................. 356/355; 356/359; 356/360; 356/363
[58] Field of Search ............... 356/358, 359, 360, 363, 356/345

[56] References Cited

U.S. PATENT DOCUMENTS

| | | | |
|---|---|---|---|
| 4,627,722 | 12/1986 | Falk et al. | 356/363 |
| 4,714,339 | 12/1987 | Lau et al. | 356/358 |
| 4,884,697 | 12/1989 | Takacs et al. | 356/360 |
| 4,976,019 | 12/1990 | Kitamura | 356/358 |
| 5,080,490 | 1/1992 | Manhart | 356/358 |
| 5,144,150 | 9/1992 | Yoshizumi et al. | 356/358 |
| 5,260,761 | 11/1993 | Barker | 356/360 |
| 5,305,091 | 4/1994 | Gelbart et al. | 356/358 |

OTHER PUBLICATIONS

Near-Field Antenna Measurements, by Dan Slater, 1991 Artech House, Inc., Chapter 4.4, "Phase Reference Thermal Compensation", pp. 75-76.

*Primary Examiner*—Samuel A. Turner
*Assistant Examiner*—Jason D. Eisenberg
*Attorney, Agent, or Firm*—Graham & James

[57] ABSTRACT

A three-axis motion tracking interferometer for use with an article under test (AUT) is provided for measurement and correction of position errors between the AUT and a near-field probing sensor due to thermal drift. The probing sensor is positioned at a plurality of points relative to the AUT to perform a phase front measurement of the AUT. Periodically, the probing sensor is positioned at a subset of the plurality of points, the subset being sufficient to define a geometric surface, such as a plane, cylinder, or sphere. A distance change measurement is performed between the AUT and the probing sensor at each of the subset of points, and three-axis components of relative motion between the AUT and the probing sensor are calculated based upon the distance change measurement. The phase front measurement of the AUT can then be corrected based upon the three-axis components.

28 Claims, 3 Drawing Sheets

THREE-AXIS MOTION TRACKING INTERFEROMETER FOR MEASUREMENT AND CORRECTION OF POSITIONAL ERRORS BETWEEN AN ARTICLE UNDER TEST AND A MEASUREMENT PROBE

BACKGROUND OF THE INVENTION

1. Field of the Invention

The present invention relates to position detection systems, and more particularly, to a three-axis motion tracking interferometer for measurement and correction of position errors between an article under test and a near-field measurement probe due to thermal drift.

2. Description of Related Art

High performance antennas are increasingly prevalent in the art as spacecraft, aircraft, ship and ground vehicle mission requirements become more sophisticated. One problem in the development and manufacture of high performance antennas is the accurate measurement of antenna performance. Traditionally, antenna performance measurement was conducted by placing the antenna at a remote location, and measuring the amplitude response characteristics as a function of orientation of the antenna in its operational range. Required measurement distances for high gain antennas range from fifty feet to three miles or more. This measurement technique, known as far-field testing, suffers from significant practical limitations, such as susceptibility to weather effects, ground reflections, and increasing real estate costs.

As an alternative to far-field testing, near-field testing was developed. A near-field test is conducted in an indoor test range using a probe to sample the field radiated near the antenna or article under test (AUT). An interferometer measures the interference between a pair of signals that have traveled through two separate paths, only one of which includes the AUT. The interferometer output is a measure of the complex gain (amplitude and phase response) of the AUT-probe transmission path relative to a reference path. A computer transforms the measured phase front data to the far-field angular equivalent using a Fourier transform technique, producing the desired antenna electrical property measurements.

The near-field measurement technique is also applicable to other types of reflecting bodies, emitters/receptors or transducers having other types of emitted waveforms, such as optical or acoustic waves, and is effective in measuring performance of antennas, lenses, anechoic chambers and compact ranges. The measuring probe may act as both a transmitting antenna and a receiving antenna for measuring a reflected phase front from a reflecting body. The reflecting or transducing bodies discussed herein are collectively referred to as antennas or transducers.

To make accurate near-field measurements, all the significant antenna energy must be sampled by the probe. Highly directive antennas, such as reflectors and waveguide phased arrays, send most of the energy in the forward direction normal to the antenna aperture. To test these types of antennas, a planar near-field scanner is utilized. Precision positioning systems, such as cartesian robots, are used to move the probe along a planar raster pattern approximately normal to the antenna aperture. Cylindrical and spherical scanners are also possible, in which the AUT is rotated relative to a measuring probe. To accurately reconstruct the measured field, the probe must sample points at some minimum spacing which is usually less than half the wavelength of the antenna signal ($\lambda/2$). Therefore, to achieve an accurate near-field measurement, the precise position of the probe and its planarity with respect to the AUT is critical.

Obtaining high accuracy position information for the probe relative to the test article has proven to be difficult to achieve. Undesired variations in the spacing between the probe and the AUT can be experienced due to thermally induced expansion and contraction resulting from periodic cycling of the air conditioning system within the test chamber. The temperature fluctuations affect the near-field measurement in two significant ways. First, the path length of the AUT-probe transmission path varies systematically during the near-field test. Second, the shape of the AUT mount and near-field scanner mount distorts adversely effecting azimuth and elevation of the AUT with respect to the probe. Each of these effects ultimately result in errors in the interference measurement.

Changes in path length are caused in part by thermal drift of the phase reference cable which carries the phase reference signal between the probe and the stationary RF measurement equipment. This path length change would be incorrectly interpreted in the near-field measurement as a change in distance in the z-axis direction between the probe and the AUT, which can significantly effect the interference measurement. Highly flexible cable, such as comprised of Goretex, is capable of maintaining electrical connection throughout the travel of the probe, but tends to experience the greatest amount of path length variation. For example, a one meter length Goretex phase reference cable that experiences a one degree Celsius temperature change at 12 GHz can have thermal drift of as much as 1.6 mils, which equates to a 0.58 degree antenna measurement error. Such an error would be outside of an acceptable measurement range for certain high performance antennas. Since near-field tests of large antenna arrays often utilize much greater phase reference cable lengths, even greater measurement errors can be experienced.

A second problem caused by temperature fluctuation is in thermal drift of the AUT mount and scanner mount. The temperature fluctuations can result in azimuthal and elevational distortion of the AUT position with respect to the probe. These distortions in AUT position further result in distortion of the energy emitted by the AUT, and decreased accuracy of the near-field measurement.

Two approaches have been utilized in the prior art to correct for the thermal expansion errors in the z-axis component of drift. The first method is to perform a single axis tie scan after completing the normal near-field raster scan. In a tie scan, the probe is moved linearly across the field of measurement, obtaining distance measurements in the z-axis direction for a plurality of points making up the linear tie scan. The tie scan measurements can then be used to correct the phase data obtained during the near-field raster scan. A disadvantage of this approach is that the points of the tie scan at the outer peripheral area of the field of measurement have reduced accuracy due to the low signal-to-noise ratio in this region, resulting in some corruption of the tie scan measurement data. Another disadvantage is that only the z-axis component of drift can be measured, and thermal drift in azimuth and elevation would not be detected.

A related method is similar to the tie scan, but utilizes individual linear points for repeated measurement of thermal drift. During the near-field raster scan operation, the probe is periodically returned to one of the points of the line to obtain phase correction data. To minimize scanner travel time, the probe is moved to the closest point of the line to the current probe position. However, this approach does not allow for azimuth or elevation measurements of thermal drift for the same reasons as the previously discussed method.

Thus, a critical need exists to provide an accurate measuring system for determining thermal drift between a probe and an article under test during a near-field measurement. It would be particularly desirable to obtain information concerning z-axis drift, as well as azimuth and elevation changes.

SUMMARY OF THE INVENTION

Accordingly, the present invention provides a three-axis motion tracking interferometer apparatus for use with an article under test (AUT). The interferometer includes a field probing sensor which is positioned at a plurality of points relative to the AUT during a near-field measurement of the AUT, either by manipulation of the probe, or the AUT. The field probing sensor is periodically returned to a subset of the plurality of points, the subset being repeatable, spatially constant, and sufficient to define a geometric shape, such as a plane, cylinder or sphere. A distance measurement is performed between the AUT and the probing sensor at each of the subset of points, and three-axis components of relative motion between the AUT and the probing sensor are calculated based upon the distance measurements. The near-field measurement of the AUT can then be corrected based upon the three-axis components, and the measurement uncertainty estimated.

In an embodiment of the present invention, four points are utilized for conducting the measurement. The three-axis components which are measured include: (1) change in distance in the z-axis direction between the field probing sensor and the AUT; (2) change in AUT elevation relative to the field probing sensor; and (3) change in AUT azimuth relative to the field probing sensor. By utilizing a fourth measurement point, errors in each of the three-axis components can be further calculated.

In an alternative embodiment of the present invention, a two-axis motion tracking interferometer is provided for use with an article under test (AUT). The interfereometer includes a field probing sensor which is positioned at a plurality of points along a single axis relative to the AUT to perform a phase front measurement of the AUT. The probing sensor is positioned periodically at a subset of the points disposed along a generally linear pattern. A change in distance is measured between the AUT and the probing sensor at each of the subset of points and two-axis components of relative motion between the AUT and the probing sensor are calculated based upon the distance change measurement. The phase front measurement of the AUT is then corrected based upon the two-axis components. The two-axis components include change in distance along a z-axis between the field probing sensor and the AUT, and either of change in elevation of the AUT relative to the field probing sensor with respect to a y-axis phase front measurement of the AUT or change in azimuth of the AUT relative to the field probing sensor with respect to an x-axis phase front measurement of the AUT.

The present invention further provides a method for determining relative position between an AUT and a field probing sensor. The method comprises the steps of: positioning the probing sensor relative to the AUT at a plurality of points defining a geometric shape, such as a plane, cylinder or sphere, or linear pattern; measuring change in distance between the AUT and the probing sensor at each of the points; calculating two or three-axis components of relative motion between the AUT and the probing sensor based upon the distance measurements; and correcting a near-field measurement of the AUT based upon the two or three-axis components. The method further comprises the step of determining errors in the two or three-axis component measurements.

A more complete understanding of the three-axis motion tracking interferometer apparatus will be afforded to those skilled in the art, as well as a realization of additional advantages and objects thereof, by a consideration of the following detailed description of the preferred embodiment. Reference will be made to the appended sheets of drawings which will be first described briefly.

DETAILED DESCRIPTION OF THE PREFERRED EMBODIMENT

Figure 1:
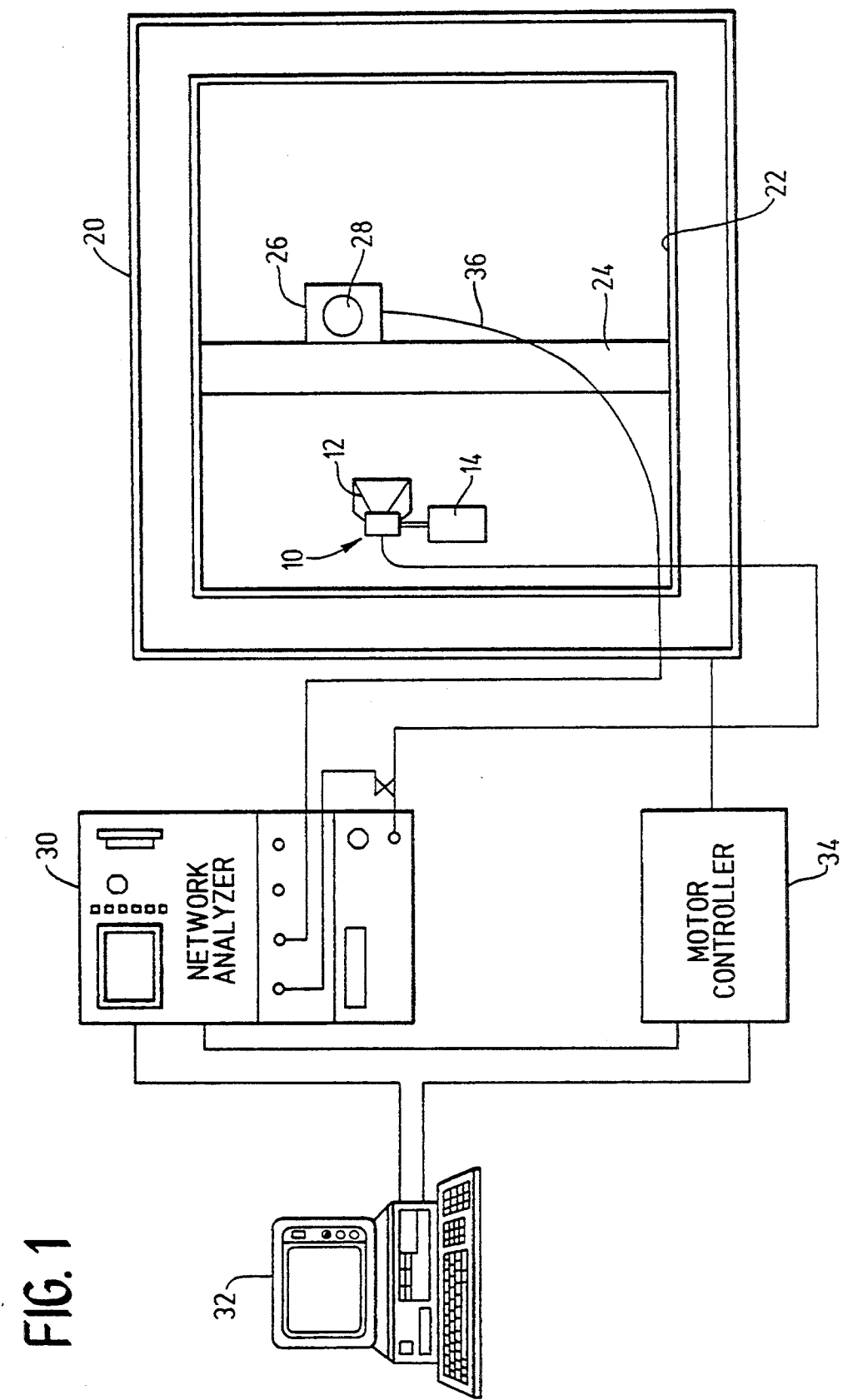
FIG. 1 illustrates a near-field antenna measurement system in accordance with the present invention.

Referring first to FIG. 1, a near-field antenna measurement system is illustrated. An article under test (AUT) 10 is secured to a test stand 14 and faces a cartesian positioning system or robot scanner 20. The AUT 10 has a feed horn 12 which directs RF power from an aperture of the AUT.

A plane of the cartesian positioning system 20 is defined by an x-axis rail 22 which is orthogonal to a y-axis rail 24. The y-axis rail 24 is capable of horizontal movement along the length of the x-axis rail 22. A probe carriage 26 is provided on the y-axis rail 24, and is capable of vertical movement along the length of the rail. A probing sensor 28 extends from the probe carriage 26 normal to the plane formed by the cartesian positioning system 20. By operation of the x and y-axis rails 22, 24, the probing sensor 28 can be manipulated to any point along a cartesian plane.

To operate the near-field test system, the probing sensor 28 is moved in a repeatable raster pattern relative to the stationary AUT 10 to sample the RF energy emitted from the AUT at a plurality of points. A motor controller 34 controls the position of the probe carriage 26 causing it to move along the sample points. The probing sensor 28 transmits an RF signal representative of the RF energy received from the AUT 10 through a phase reference cable 36 to a network analyzer 30, that receives and compiles the data. The network analyzer 30 measures the interference between the RF signal received by the probing sensor and a separate RF signal that has traveled through a reference path defined within the network analyzer. The pair of propagating wave fronts can be combined at the network analyzer 30 either by addition or multiplication, although most microwave interferometers use the multiplicative technique. The interferometer output is a measure of the complex gain (amplitude and phase response) of the AUT-probing sensor transmission path relative to the reference path. A computer 32 controls the operation of the motor controller 34 and produces the far-field equivalent transformation of the amplitude and phase data by a Fourier transform technique.

The phase reference cable 36 carries the RF signal between the moving probing sensor 28 and the stationary network analyzer 30. The constant movement of the cable 36 as the probing sensor 28 travels along the raster path introduces systematic stress forces into the cable which tend to distort its electrical length. Such bending stress can be largely offset by the use of rotary joints (not shown) for the cable 36. Further, the thermal effects within the test chamber also result in undesired changes in the electrical length of the cable 36 by expansion and contraction of the conductive core of the cable. As noted above, such electrical length changes are interpreted by the network analyzer 30 as a z-axis position error of the probing sensor 28.

Figure 2:
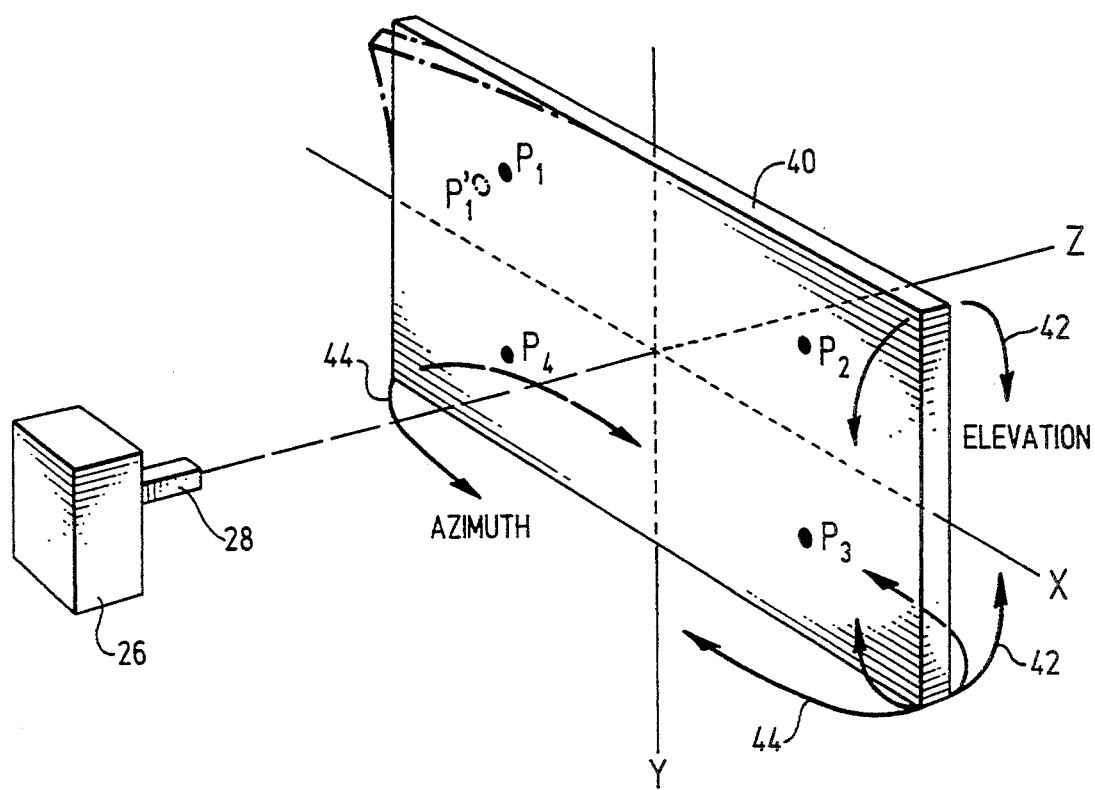
FIG. 2 is a perspective view of a field probing sensor and article under test (AUT), illustrating three-axis components of relative motion between the field probing sensor and the AUT.
Figure 3:
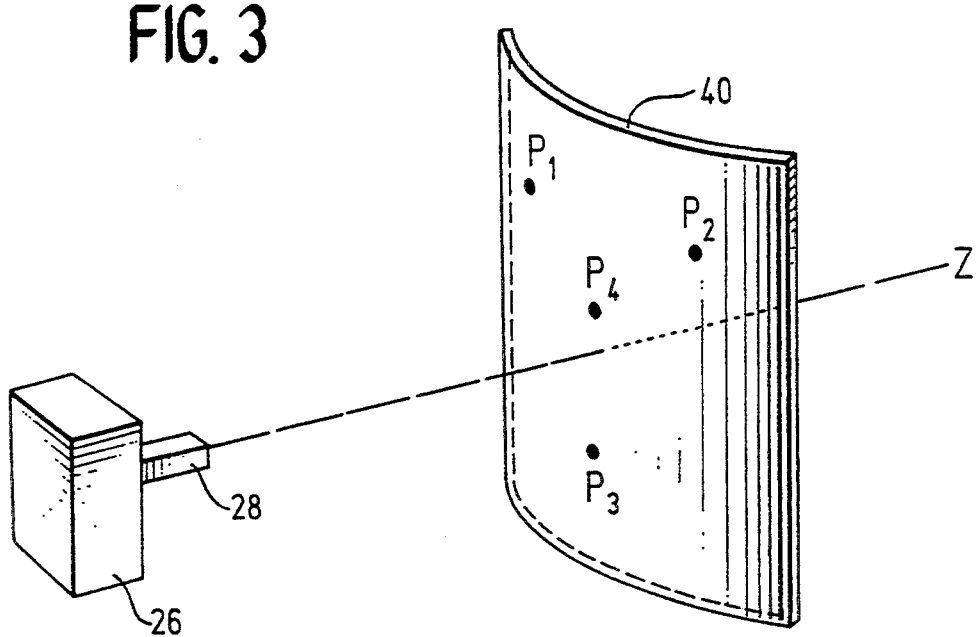
FIG. 3 is a perspective view as in FIG. 2 of a field probing sensor and article under test (AUT) emitting a phase front measured along a cylindrical surface.
Figure 4:
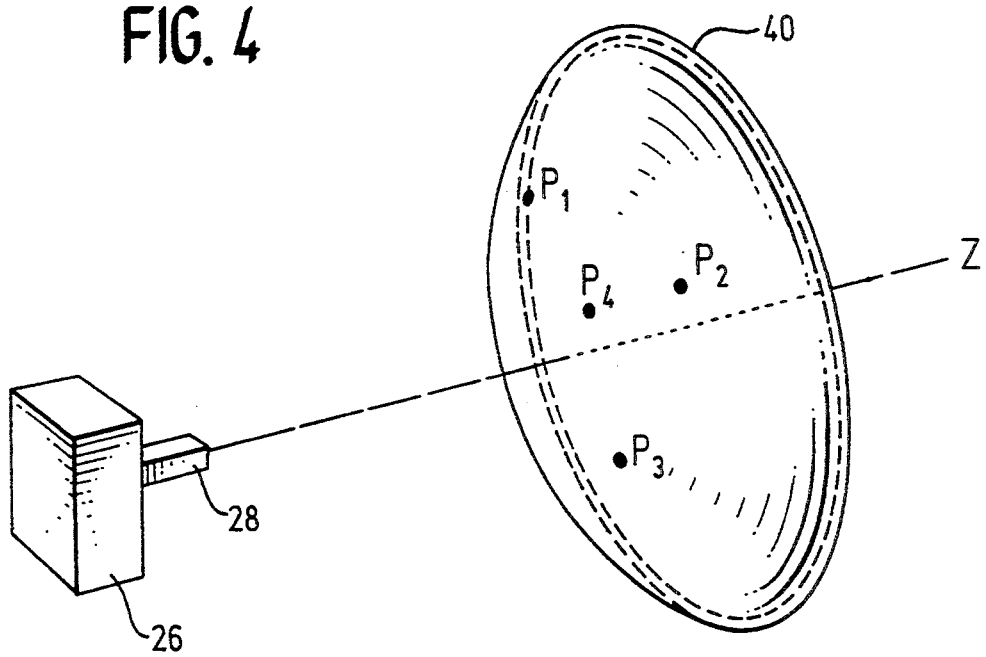
FIG. 4 is a perspective view as in FIG. 2 of a field probing sensor and article under test (AUT) emitting a phase front measured along a spherical surface.

Referring next to FIG. 2, the phase front 40 of the RF energy radiated by the AUT 10 is illustrated. A phase front is a surface having equal phase. An AUT may have a variety of shapes, depending on the type and function of the transducer. In FIG. 2, the phase front 40 is illustrated as a planar surface disposed in a plane formed by the x and y-axes. The phase front 40 may also be measured along a cylindrical surface, as illustrated in FIG. 3, or along a spherical surface, as illustrated in FIG. 4, depending on the ordinary use of the AUT. For non-planar phase front geometries, a combination of probing sensor movement and AUT rotation may be utilized to sample all the emitted phase front energy.

In FIG. 2, the probing sensor 28 is disposed perpendicular to the phase front 40 in the z-axis direction. As described above, changes in the electrical length of the phase reference cable 36 appear to the network analyzer 30 as changes in the distance between the probing sensor 28 and the phase front 40 in the z-axis direction. Thermal fluctuations also effect the shape of the phase front 40 in the directions of elevation and azimuth. Elevational changes are shown by the arrows 42, and azimuthal changes are shown by the arrows 44. The elevational and azimuthal changes may be uniform, such as a pivotal variation of the phase front 40 along either or both of the x and y-axes, or may appear as a curling of the phase front at a portion of the phase front. While the precise shape of the phase front distortion is unpredictable, a major component corresponds to solid body motion which tends to be systematic with the thermal fluctuations.

In the present invention, the extent of the variation along the z-axis, as well as the elevational and azimuthal changes, can be periodically determined, and the near-field transformation corrected accordingly. At regular time intervals, the raster scanning of the probing sensor 28 relative to the AUT 10 is interrupted, and the probing sensor is positioned sequentially at four distinct points, illustrated in FIG. 2 as $P_1$, $P_2$, $P_3$, and $P_4$. The four points are not linear, but must be repeatable, spatially constant, and define a geometric surface, such as a plane, sphere or cylinder. FIG. 2 shows the four points being non-linear and generally evenly spaced across the phase front 40. In conducting near-field tests of extremely large AUTs in which the raster scan time is quite lengthy, it may be desirable to situate the four points relative to a distinct quadrant or portion of the phase front 40. FIGS. 3 and 4 show three of the four points forming a generally triangular shape, and a fourth point disposed generally within the triangular shape. The fourth point is necessary to provide a curvature measurement, as will be clear from the explanation below.

At each of the points, the probing sensor 28 samples the wave front 40 energy in the same manner as during the normal near-field scan, except with a longer receiver integration time. The interferometer of the network analyzer 30 performs a distance measurement relative to the reference path for each of the points. The measurement sample taken at each point provides a measure of relative change of position, and is translated to an absolute position measurement by comparison with the near-field scan data. However, it is possible to obtain absolute position measurements without resort to the near-field data by using multiple frequency data. After the measurements are conducted for each of the points, the probing sensor 28 returns to the position in which it previously stopped scanning, and resumes the near-field scanning operation.

Measurement values from three of the points would determine a planar surface. The solid body motion component of the phase front 40 can be determined by measuring the azimuth or elevation of the planar surface relative to an ideal orthogonal surface lying in the x and y-axes. In the planar case, the measurement value obtained from the fourth point can be used to estimate uncertainty errors in the previous three point measurements. For example, FIG. 2 shows the phase front 40 being distorted in the upper right hand corner. Measurement point P1 is deformed to a new location identified as $P_1'$. A sample of the phase front 40 energy would identify the distortion, and provide a measure of the distortion uncertainty. In the circular or spherical case, the fourth point would provide information regarding the curvature of the phase front 40.

By performing the periodic measurement scan at regular time intervals, an interpolated determination of the time varying azimuth, elevation and z-axis motion of the AUT 10 can be made. Moreover, time varying higher order deformations, i.e., Zernike coefficients, can also be determined if more than four points are measured. Once the time varying values are determined, the far-field equivalent transformation of the near-field measurement can be adjusted accordingly by performing a time varying de-rotation and translation of the phase front 40 that effectively nulls the thermal drift. Alternatively, the distortion due to the thermal fluctuations can be nulled by physically re-positioning the probe sensor 28 along the z-axis with respect to the phase front 40. Control servos within the probe carriage 26 permit adjustment of the probe sensor 28 to compensate for the distortion effects.

In an alternative embodiment of the present invention, position errors between an AUT and a probing sensor in a two-axis near-field scan can also be determined. In a two-axis scan, the probing sensor 28 is manipulated only in a single dimension, such as the x-axis direction, and the phase front measured in the z-axis direction as in the three-axis case. The probing sensor 28 samples the emitted or reflected energy from the AUT 10 at a plurality of points along the single axis.

At regular time intervals, the near-field scanning of the probing sensor 28 relative to the AUT 10 is interrupted, and the probing sensor is positioned sequentially at two or more distinct points along the particular axis. At each of the points, the probing sensor 28 samples the wave front 40 energy in the same manner as during the near-field scan, except with a longer receiver integration time, and a relative distance measurement taken. After the measurements are conducted for each of the points, the probing sensor 28 returns to the position at which it previously stopped scanning, and resumes the near-field scanning operation.

Unlike the three-axis case, the measurement values from the two or more points would determine a generally linear pattern. The solid body motion component of the phase front 40 can be determined for azimuth in the x-axis linear scan case, or for elevation in the y-axis linear scan case, as well as motion in the z-axis direction for either the x or y-axis case. A third measurement point can be used to estimate uncertainty errors in the previous measurements. As in the three-axis case, the near-field measurement scan can be corrected either analytically or physically based on the two-axis motion component information.

It is anticipated that the method of determining the relative position between the AUT 10 and the field probing sensor 28 for either the two or three-axis case would be implemented in software to be executed by the computer 32. The computer software would execute a method comprising the following steps: (1) positioning the probing sensor 28 relative to the AUT 10 at a plurality of points defining a geometric surface (three-axis case) or linear pattern (two-axis case); (2) measuring change in distance between the AUT 10 and the field probing sensor 28 at each of the points; and (3) calculating components of relative motion between the AUT 10 and the probing sensor 28 based upon the distance measurements. Once the components are determined, the near-field measurement of the AUT 10 is corrected either analytically, by altering the near-field measurement values, or physically, by moving the scan surface defined by the movement of the field probing sensor 28 to null for the measured distortion. The method further comprises the step of estimating errors in the two or three-axis component measurements.

It should be apparent that a variation of this technique would be applicable to all other scanning interferometers, such as ISAR radars, anechoic chamber imaging for microwave or acoustic testing, and optical interferometers used for lens testing as a way of minimizing the severe problem of vibration. It should also be appreciated by those skilled in the art that various modifications, adaptations and alternative embodiments thereof may be made within the spirit and scope of the present invention, which is defined by the following claims.

What is claimed is:

1. A three-axis motion tracking interferometer for use with an article under test (AUT), comprising:
    a field probing sensor;
    means for positioning said field probing sensor at a plurality of points spaced from said AUT to perform a phase front measurement of said AUT, said positioning means periodically positioning said probing sensor at a subset of said points, the subset having a number of points sufficient to define a geometric shape; and
    means for measuring distance change between said AUT and said probing sensor at each of said subset of points and calculating three-axis components of relative motion between said AUT and said probing sensor based upon said distance change measurement;
    wherein said phase front measurement of said AUT is corrected based upon said three-axis components.

2. The three-axis motion tracking interferometer of claim 1, wherein a first of said three-axis components is change in distance along a z-axis between said field probing sensor and said AUT.

3. The three-axis motion tracking interferometer of claim 2, wherein a second of said three-axis components is change in elevation of said AUT relative to said field probing sensor.

4. The three-axis motion tracking interferometer of claim 3, wherein a third of said three-axis components is change in azimuth of said AUT relative to said field probing sensor.

5. The three-axis motion tracking interferometer of claim 1, further comprising means for determining measurement errors in said three-axis components.

6. The three-axis motion tracking interferometer of claim 1, wherein said geometric shape is generally planar.

7. The three-axis motion tracking interferometer of claim 1, wherein said geometric shape is generally cylindrical.

8. The three-axis motion tracking interferometer of claim 1, wherein said geometric shape is generally spherical.

9. The three-axis motion tracking interferometer of claim 1, wherein said number of points in said subset comprises at least four points.

10. A motion tracking interferometer for monitoring change in relative position between a transducer and a probing sensor, comprising:
    means for positioning said probing sensor relative to said transducer at a plurality of points spaced from said transducer and measuring change in distance between said transducer and said probing sensor at each of said points; and
    means for calculating components of relative motion between said transducer and said probing sensor based upon said distance measurements.

11. The motion tracking interferometer of claim 10, further comprising means for correcting a performance measurement of said transducer based upon said components.

12. The motion tracking interferometer of claim 10, wherein a first of said components is change in distance along a z-axis between said probing sensor and said transducer.

13. The motion tracking interferometer of claim 12, wherein a second of said components is change in elevation of said transducer relative to said probing sensor.

14. The motion tracking interferometer of claim 13, wherein a third of said components is change in azimuth of said transducer relative to said probing sensor.

15. The motion tracking interferometer of claim 10, further comprising means for determining measurement errors in said components.

16. The motion tracking interferometer of claim 10, wherein said plurality of points comprises at least four.

17. The motion tracking interferometer of claim 10, wherein said plurality of points define a geometric shape selected from a group comprising generally planar, cylindrical and spherical.

18. A two-axis motion tracking interferometer for use with an article under test (AUT), comprising:
   a field probing sensor;
   means for positioning said field probing sensor at a plurality of points spaced from said AUT to perform a phase front measurement of said AUT, said positioning means periodically positioning said probing sensor at a subset of said plurality of points, the subset being disposed along a generally linear pattern; and
   means for measuring distance change between said AUT and said probing sensor at each one of said subset of points and calculating two-axis components of relative motion between said AUT and said probing sensor based upon said distance change measurement;
   wherein said phase front measurement of said AUT is corrected based upon said two-axis components.

19. The two-axis motion tracking interferometer of claim 18, wherein a first of said two-axis components is change in distance along a z-axis between said field probing sensor and said AUT.

20. The two-axis motion tracking interferometer of claim 19, wherein a second of said two-axis components is change in elevation of said AUT relative to said field probing sensor with respect to a y-axis phase front measurement of said AUT.

21. The two-axis motion tracking interferometer of claim 19, wherein a second of said two-axis components is change in azimuth of said AUT relative to said field probing sensor with respect to an x-axis phase front measurement of said AUT.

22. The two-axis motion tracking interferometer of claim 18, further comprising means for determining measurement errors in said two-axis components.

23. A method for determining relative position between an article under test (AUT) and a field probing sensor, comprising the steps of:
   positioning said field probing sensor spaced from said AUT at a plurality of points defining a geometric surface;
   measuring change in distance between said AUT and said field probing sensor at each of said plurality of points; and
   calculating components of relative motion between said AUT and said field probing sensor based upon said distance measurements.

24. The method of claim 23, further comprising the step of correcting a phase front measurement of said AUT based upon said components.

25. The method of claim 23, further comprising the step of estimating measurement errors in said components.

26. The method of claim 23, wherein a first of said components is change in distance along a z-axis between said field probing sensor and said AUT.

27. The method of claim 26, wherein a second of said components is change in elevation of said AUT relative to said field probing sensor.

28. The method of claim 27, wherein a third of said components is change in azimuth of said AUT relative to said field probing sensor.

* * * * *